(12) United States Patent
Klein et al.

(10) Patent No.: US 11,728,557 B2
(45) Date of Patent: Aug. 15, 2023

(54) PASSIVE-INTERMODULATION-MITIGATING MOUNTING ASSEMBLY

(71) Applicant: Sabre Communications Corporation, Sioux City, IA (US)

(72) Inventors: Karson W. Klein, LeMars, IA (US); Michael James Burnett, Sioux city, IA (US); Jacob John Robinson, Pender, NE (US); Jeffery Richard Stangler, Yulee, FL (US); Paul Scott Everline, FLowery Branch, GA (US)

(73) Assignee: Sabre Communications Corporation, Sioux City, IA (US)

( * ) Notice: Subject to any disclaimer, the term of this patent is extended or adjusted under 35 U.S.C. 154(b) by 0 days.

(21) Appl. No.: 17/492,348

(22) Filed: Oct. 1, 2021

(65) Prior Publication Data

US 2022/0052433 A1 Feb. 17, 2022

Related U.S. Application Data

(63) Continuation-in-part of application No. 16/700,764, filed on Dec. 2, 2019, now Pat. No. 11,139,644.

(51) Int. Cl.
*H05K 7/02* (2006.01)
*H01Q 1/12* (2006.01)
*F16F 1/38* (2006.01)

(52) U.S. Cl.
CPC ........ *H01Q 1/1242* (2013.01); *F16F 1/3835* (2013.01); *H01Q 1/1207* (2013.01)

(58) Field of Classification Search
USPC .......................................... 361/807, 809, 810
See application file for complete search history.

(56) References Cited

U.S. PATENT DOCUMENTS

| 7,183,996 | B2 | 2/2007 | Wensink |
| 9,722,295 | B2 * | 8/2017 | Ortel .................... H01Q 1/1228 |
| 11,139,644 | B2 | 10/2021 | Klein et al. |

(Continued)

OTHER PUBLICATIONS

U.S. Appl. No. 16/700,764 U.S. Pat. No. 11,139,644, filed Dec. 2, 2019, Passive-Intermodulation-Mitigating Mounting Assembly.

(Continued)

*Primary Examiner* — Hung S. Bui
(74) *Attorney, Agent, or Firm* — Schwegman Lundberg & Woessner, P.A.

(57) ABSTRACT

A passive-intermodulation-mitigating mounting assembly for a fixture, such as can be affixed to a utility or communications monopole can include a first bracket and a second bracket respectively defining a first through hole and a second through hole. In some examples, a mounting plate supports an antenna or a radio. A fastener can extend through the first through hole and the second through hole, for instance to couple the first bracket with the second bracket to attach the mounting assembly to a fixture. The passive-intermodulation-mitigating mounting assembly can include a bushing that can be inserted into a through hole, and the bushing can physically and electrically isolate the fastener from one or more of the brackets. The isolation of the bushing helps inhibit the passive-intermodulation of the mounting assembly when the fastener extends, via the first bushing, through at least one of the through holes.

21 Claims, 13 Drawing Sheets

(56) References Cited

U.S. PATENT DOCUMENTS

| | | | |
|---|---|---|---|
| 11,168,727 B2* | 11/2021 | Axelsson | F16B 37/047 |
| 2002/0105477 A1 | 8/2002 | Bragg et al. | |
| 2002/0196195 A1 | 12/2002 | Vermette et al. | |
| 2006/0188769 A1* | 8/2006 | Bernard | H01M 8/248 |
| | | | 429/456 |
| 2012/0228428 A1 | 9/2012 | Deganis et al. | |
| 2014/0220903 A1 | 8/2014 | Schulz et al. | |
| 2014/0363254 A1* | 12/2014 | Kondo | B64C 1/1484 |
| | | | 411/337 |
| 2017/0264005 A1 | 9/2017 | Roy et al. | |
| 2018/0207502 A1 | 7/2018 | Remaklus et al. | |
| 2020/0185827 A1* | 6/2020 | Kaistha | H01Q 1/1228 |
| 2021/0167589 A1 | 6/2021 | Klein et al. | |

OTHER PUBLICATIONS

"U.S. Appl. No. 16/700,764, Examiner Interview Summary dated Jun. 2, 2021", 2 pgs.

"U.S. Appl. No. 16/700,764, Non Final Office Action dated Mar. 3, 2021", 13 pgs.

"U.S. Appl. No. 16/700,764, Notice of Allowance dated Jun. 9, 2021", 7 pgs.

"U.S. Appl. No. 16/700,764, Response filed Jun. 1, 2021 to Non Final Office Action dated Mar. 3, 2021", 13 pgs.

* cited by examiner

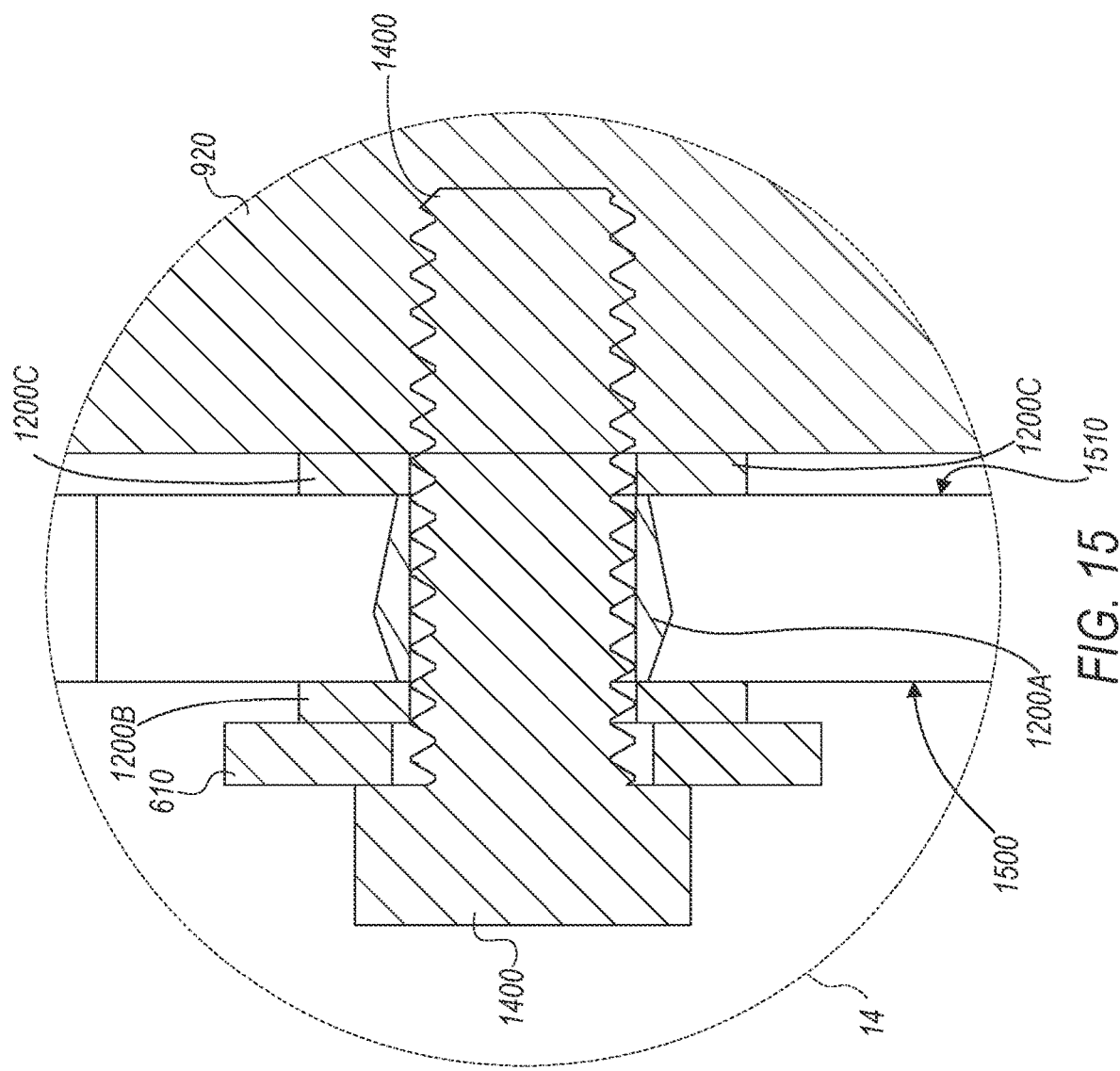

PASSIVE-INTERMODULATION-MITIGATING MOUNTING ASSEMBLY

CLAIM OF PRIORITY

This patent application claims the benefit of priority of Klein et al. U.S. patent application Ser. No. 16/700,764, entitled "PASSIVE-INTERMODULATION-MITIGATING MOUNTING ASSEMBLY," filed on Dec. 2, 2019, which is hereby incorporated by reference herein in its entirety.

TECHNICAL FIELD

This document pertains generally, but not by way of limitation, to a mounting assembly configured to mount one or more of a radio or an antenna to a mounting fixture, such as can be located on a utility or communications monopole.

BACKGROUND

Utility poles support equipment (e.g., power wires, telecommunications equipment or wires, or the like) above ground level.

SUMMARY

The present inventors have recognized, among other things, that a problem to be solved can include inhibiting passive-intermodulation of mechanical components for a utility or communications system. Passive-intermodulation can introduce interference into one or more electromagnetic signals, such as those being communicated by a radio transceiver of a cellular or small cell or other communications system. Interference can degrade the performance of the system. In one approach, mechanical components (e.g., a chassis, housing, mounting bracket, fastener, support frame, monopole, or the like) are mated together (e.g., touching, adjacent, abutted, engaged, joined, interfacing, or the like). For instance, a fastener (e.g., a bolt, screw, nut, washer, or the like) can facilitate attaching a mounting bracket to a fixture (e.g., a mounting pipe, platform, support, frame, or the like) of a utility por or monopole. The fastener can extend through a portion of the mounting bracket, and the fastener can mate with the mounting bracket (e.g., an exterior surface of a bolt can touch a sidewall of a through hole of the mounting bracket).

The mating of the mechanical components can introduce non-linearities into the system. The non-linearities can cause passive-intermodulation of electromagnetic signals when the signals are transmitted through the mechanical components with a non-linear characteristic. Accordingly, the passive-intermodulation due to the mated mechanical components generates interference in the signals, for example between one or more cellular network signals (e.g., CDMA, LTE, 5G, or the like). The interference in the signals degrades the communications performance of the system.

The present subject matter can help provide a solution to these problems, such as by providing a passive-intermodulation-mitigating mounting assembly for a utility or communications monopole. The mounting assembly can include a first bracket, and the first bracket can define a first through hole and include a mounting plate extending from the first bracket. In some examples, the mounting plate supports an antenna or a radio (e.g., a radio for a cellular network). The mounting assembly can include a second bracket defining a second through hole. A fastener can extend through the first through hole and the second through hole, for instance to couple the first bracket with the second bracket to attach the mounting assembly to a fixture of the monopole.

The passive-intermodulation-mitigating mounting assembly can include a bushing, and the bushing can include a non-conductive material such as an insulating or dielectric material. The bushing can be configured for insertion into the first through hole or the second through hole, and the first bushing can physically and electrically isolate the fastener from the first bracket or the second bracket. The isolation of the first bushing from electrical conduction between mechanical components can help inhibit or reduce the passive-intermodulation of the mounting assembly when the fastener extends, via the first bushing, through at least one of the first through hole or the second through hole.

The isolation of the first bushing inhibits electrical conduction between the mechanical components. Accordingly, the first bushing reduces non-linearities in the system, for instance because metal components of the system (e.g., the fastener, first bracket, and second bracket) are physically and electrically isolated. The isolation provided by the first bushing can help inhibit or reduce the passive-intermodulation of the mounting assembly. As a result, the communications performance of the system is improved.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 15 illustrates a detailed cross-sectional view of another example of the passive-intermodulation-mitigating mounting assembly of FIG. 14 at the circle 14.

DETAILED DESCRIPTION

Figure 1:
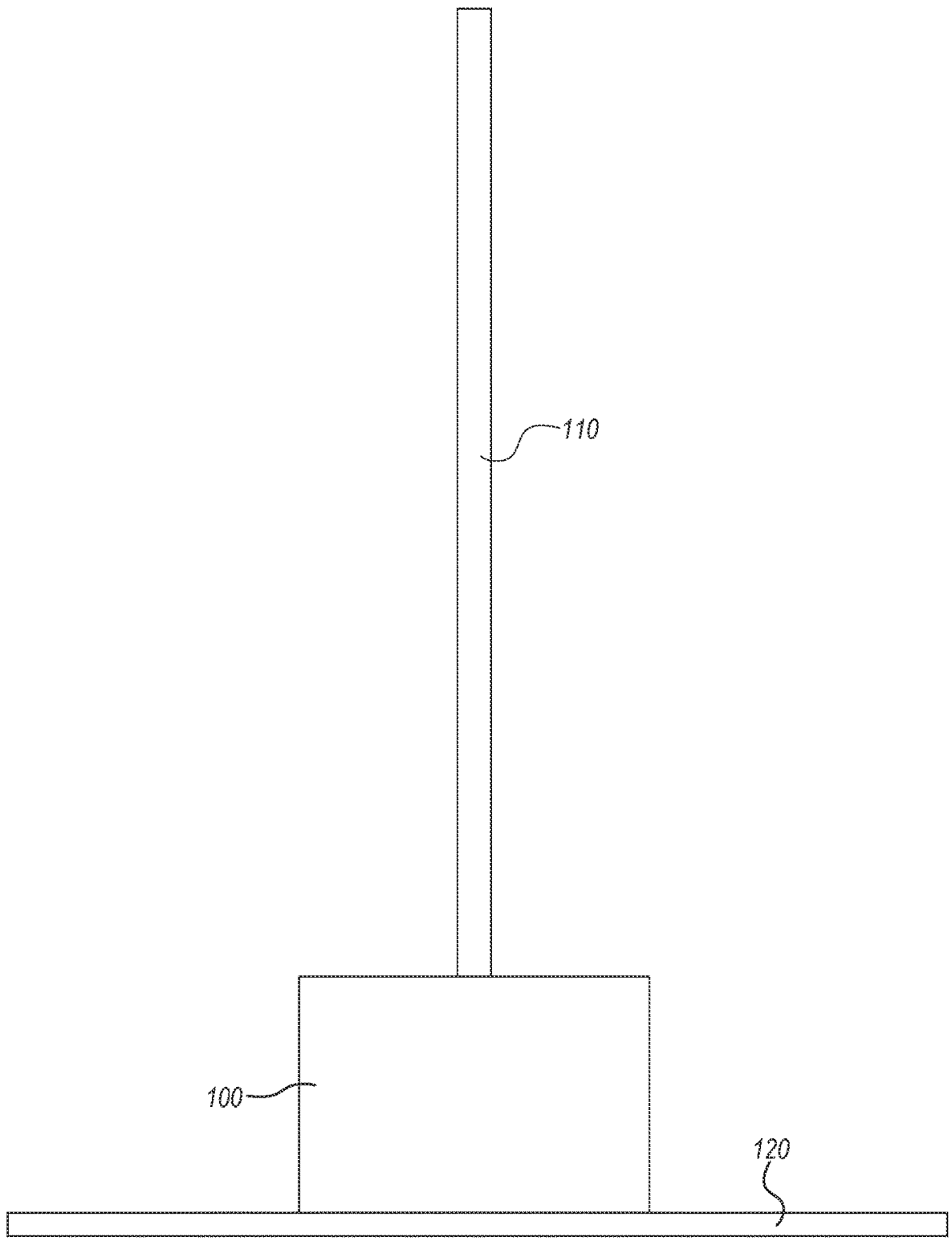
FIG. 1 illustrates a schematic view of a communications or other utility pole mounting structure and a monopole or other utility pole.

FIG. 1 illustrates a schematic view of a communications or other utility pole mounting structure 100 and a monopole or other communications or utility pole 110. The mounting structure 100 can be coupled to an anchoring surface 120 (e.g., a ground surface, a concrete footing, or the like). In one example, a portion of the mounting structure 100 is encased in concrete and then buried underground (e.g., with a fill material, for instance dirt, gravel, or the like). The pole 110 is configured to attach to the mounting structure 100, and the mounting structure 100 provides structural support for the pole 110.

The pole 110 can support equipment (e.g., power wires, telecommunication equipment or wires, or the like). In an example, a series of poles 110 are arranged alongside a roadway and power transmission lines are strung along the series of utility poles. In another example, cellular device infrastructure (e.g., antennas, data processing equipment, or the like) are coupled to the pole 110. The pole 110 extends a distance from the mounting structure 100 to elevate the equipment so that the equipment is isolated from the ground surface, for example to allow vehicles or people to travel beneath the equipment without coming into contact with the equipment.

Figure 2:
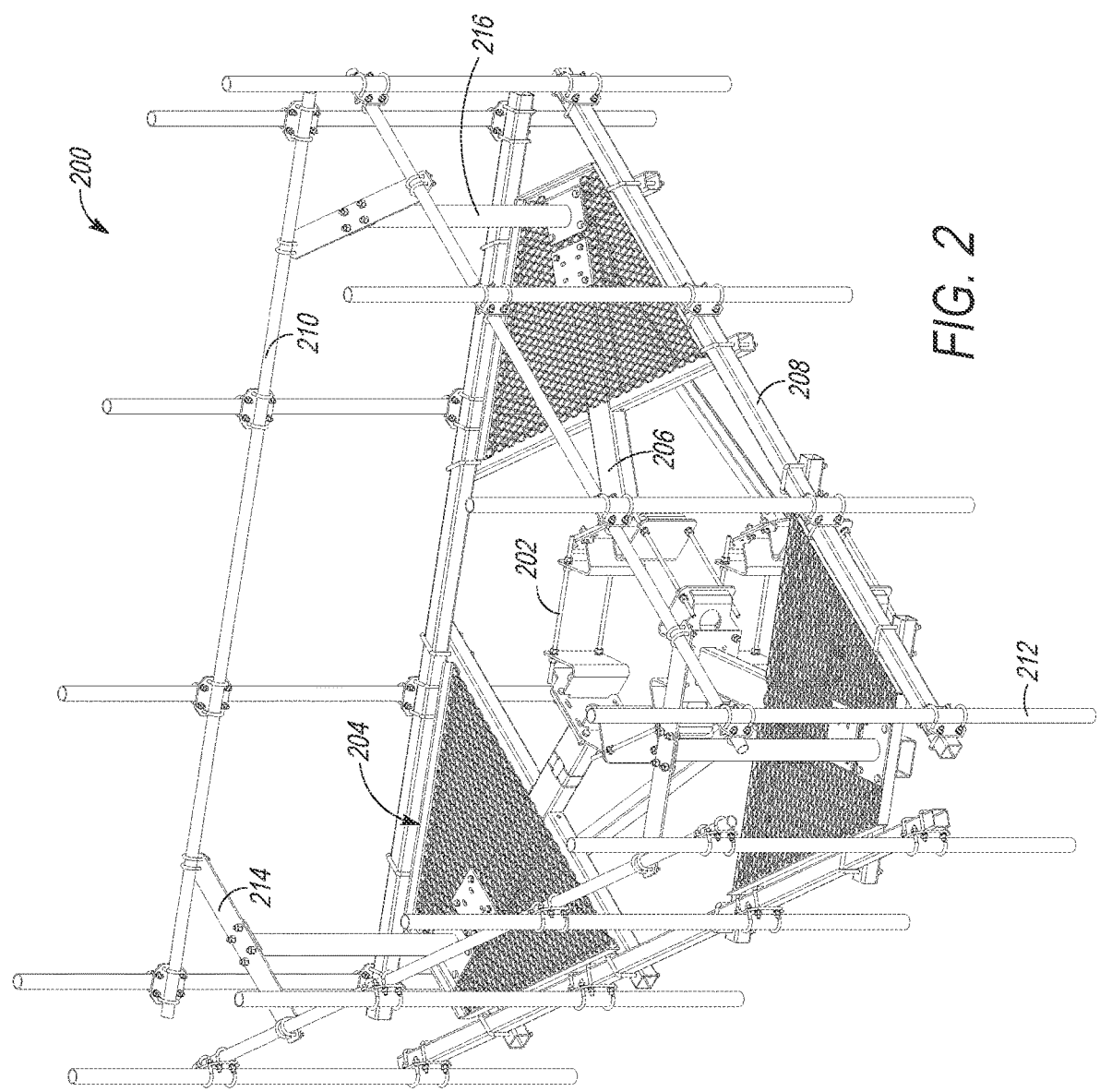
FIG. 2 illustrates an example of a platform assembly such as can be mounted onto a utility or communications monopole.

FIG. 2 illustrates an example of a platform assembly 200 such as can be mounted onto a monopole (e.g., the pole 110, shown in FIG. 1), such as via a bracket 202. In an example, the bracket 202 can include a collar, such as a tri-collar bracket assembly that can accommodate a 10 inch through 40 inch monopole extending there through. Any number (e.g., three or four) of platforms 204 can be mounted to the bracket 202, such as on arms 206 extending laterally and radially therefrom. The platforms 204 can respectively include a trapezoidal or other frame extending from the arms. A metal mesh or other flooring material can be welded or otherwise affixed to the frames of the platforms 204, such as to provide a floor or step that a human utility or communications worker can stand upon, such as while the communications worker is mounting communications or other equipment directly or indirectly to the monopole.

Adjacent platforms 204 can be connected and braced by square tube or other lower rails 208, which can be bolted to peripheral edges of the adjacent platforms, such as to form a triangle, such as shown in FIG. 1. A similar triangular arrangement of upper rails 210 can be located above corresponding lower rails 208. Vertical mounting pipes 212 can extend between the lower rails 208 and the corresponding upper rails 210, such as by being bolted thereto, such as using U-bolts, or otherwise. The vertical mounting pipes 212 can support the upper rails 210 above the corresponding lower rails 208. Corner connection plates 214 can be bolted between adjacent upper rails 210, such as using U-bolts or otherwise, such as to secure adjacent upper rails 210 to each other in their triangular arrangement.

The platform assembly 200 can include a number (e.g., one or more of three) of vertical pedestals 216 that can be bolted to and extend between respective platforms 204 and corresponding corner connection plates 214 that are located above such respective platforms 204. This can provide increased stability to the triangular arrangement of upper rails 210, which, in turn, can allow the platform assembly 200 to bear more equipment or other weight, including when there is variability in the height or vertical location of one or more of the individual vertical pipes 112.

Figure 3:
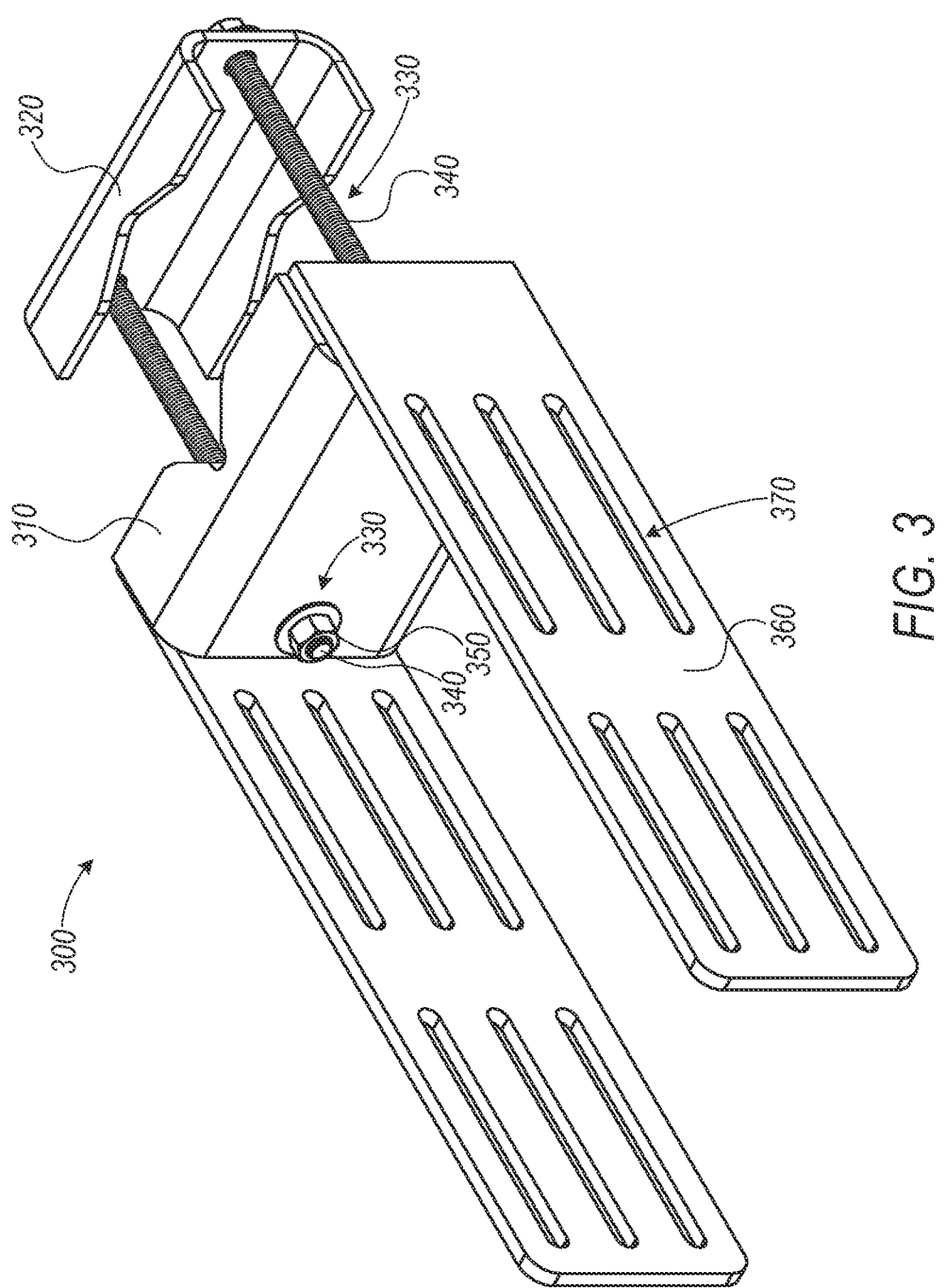
FIG. 3 illustrates a perspective view of an example of a passive-intermodulation-mitigating mounting assembly for a utility or communications pole.

FIG. 3 illustrates a perspective view of an example of a passive-intermodulation-mitigating mounting assembly 300 such as for mounting to a vertical pipe 212 or other fixture that can, in turn, be directly or indirectly mounted to a utility or communications pole (e.g., the monopole 110, shown in FIG. 1). The mounting assembly 300 can support one or more electronic components (e.g., a radio, antenna, or the like) and can facilitate mounting of such electronic components to the monopole 110 (shown in FIG. 1) or the platform assembly 200 (shown in FIG. 2). The passive-intermodulation-mitigating mounting assembly 300 can include a first bracket 310 and a second bracket 320. The brackets 310, 320 can attach to a fixture, for example one or more components of the platform assembly 200 (e.g., the vertical mounting pipes 212, shown in FIG. 2). For example, the brackets 310, 320 can straddle (e.g., surround, sandwich, or the like) a vertical mounting pipe 212 or one of the upper rails 210 such as to attach the mounting assembly 300 to the fixture.

One or more fasteners 330 can help couple the bracket 310 with the bracket 320 to attach the brackets 310, 320 to the fixture of the utility pole 110 (shown in FIG. 1) or platform assembly 200 (shown in FIG. 2). For example, the mounting assembly 300 can include a threaded rod 340 and a nut 350. The nut 350 can engage with the threaded rod 340 to couple the brackets 310, 320 together. For instance, the threaded rod 340 can extend through the brackets 310, 320 and the nut 350 can engage with the threaded rod 340 to couple (e.g., secure, fix, join, or the like) the first bracket 310 with the second bracket 320. In an example, the brackets 310, 320 straddle a fixture (e.g., the vertical mounting pipes 212) and the threaded rod 340 and the nut 350 help attach the mounting assembly 300 to the fixture, for instance by compressing the brackets 310, 320 against the fixture.

As described herein, the mounting assembly 300 supports one or more electronic components (e.g., a radio, antenna, or the like) and facilitates indirect mounting of the electronic components to a fixture, such as can in turn be mounted to the pole 110 (shown in FIG. 1) or the platform assembly 200 (shown in FIG. 2). For example, a mounting plate 360 can extend from one or more of the brackets 310, 320 and the electronic components can be coupled to the mounting plate 360. The mounting plate 360 can define one or more mounting features 370 that facilitate attachment of the electronic components to the mounting plate 360. For instance, the mounting features 370 can include (but are not limited to) a slot, groove, ridge, keyway, key, through hole, channel, socket, plug, or like. In an example, the electronic component (or a fastener, for instance a bolt) engages with the mounting features 370 such as to attach the electronic components to the mounting plate 360. One or more of the fasteners 330 can extend through the mounting features 370, for instance to attach the electronic components to the mounting plate 360.

Figure 4:
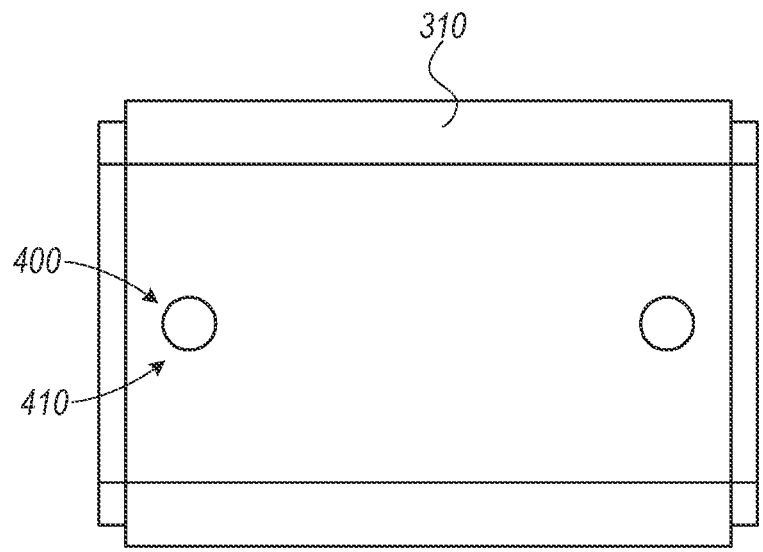
FIG. 4 illustrates an end view of the first bracket.
Figure 5:
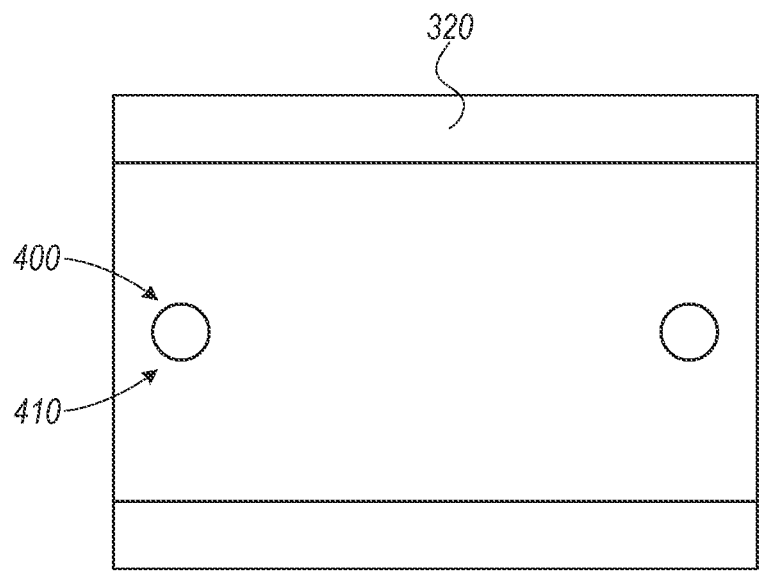
FIG. 5 illustrates an end view of the second bracket.

FIG. 4 and FIG. 5 illustrate end views of the first bracket 310 and the second bracket 320, respectively. The bracket 310 (or the bracket 320) can define a through hole 400. The through hole can extend through a thickness of the bracket 310. The through hole 400 can be sized and shaped to receive one or more of the fasteners 330, for instance the threaded rod 340 (shown in FIG. 3). Accordingly, a through hole profile 410 of the through hole 400 can correspond to a profile (e.g., one or more of cross-section, shape, size, dimensions, contour, radius, perimeter, circumference, outline, boundary, configuration, pattern, arrangement, thickness or the like) of one or more of the fasteners 330.

Figure 6:
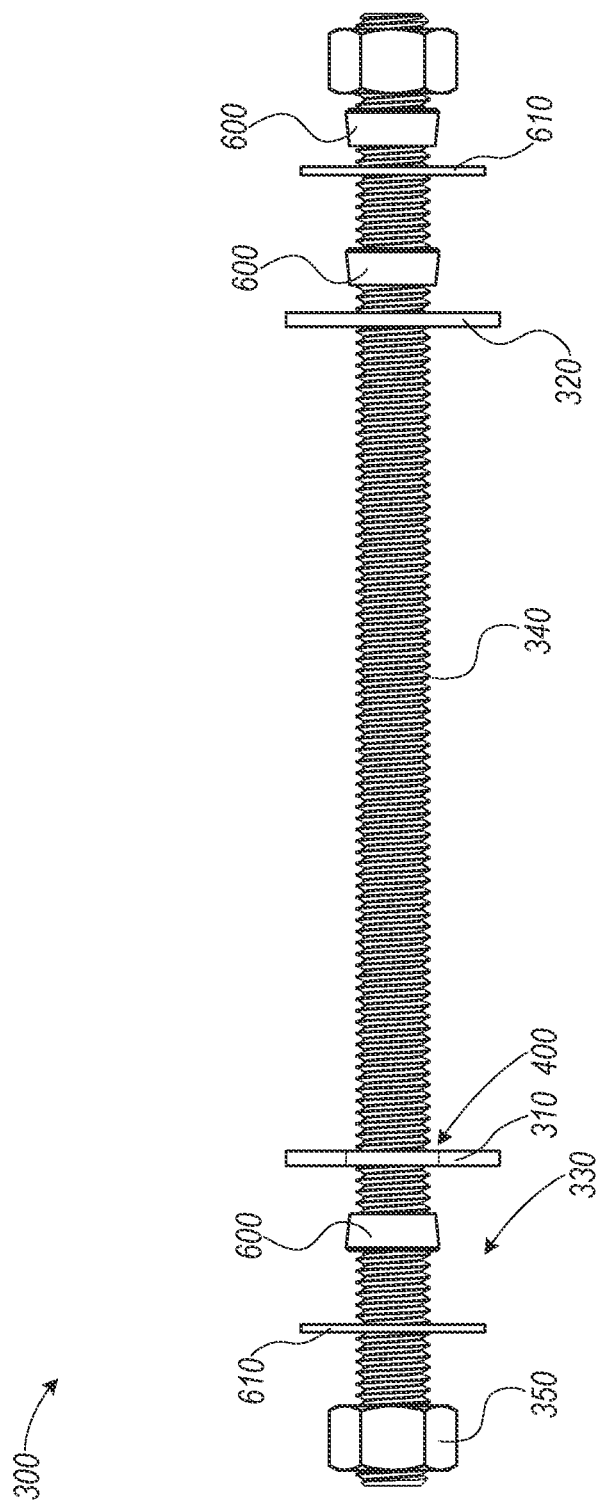
FIG. 6 illustrates a side view of another example of the passive-intermodulation-mitigating mounting assembly.

FIG. 6 illustrates a side view of another example of the passive-intermodulation-mitigating mounting assembly 300. The graphical representation of the brackets 310, 320 has been simplified in FIG. 6 for clarity. The passive-intermodulation-mitigating mounting assembly 300 can include an insulating or dielectric bushing 600 that helps physically and electrically isolate the fasteners 330 from the brackets 310, 320. For example, the bushing 600 can be located between the bracket 310 and the fasteners 330 (or between the bracket 320 and the fasteners 330). The electrical isolation provided by the bushing 600 can help inhibit electrical conduction between the mechanical components of the utility or communications system and thereby reduces passive-intermodulation of electromagnetic signals that would otherwise be transmitted via electrical conduction through the mechanical components.

In an example, the through hole 400 can be sized and shaped to receive the bushing 600, and the bushing 600 can be inserted into the through hole 400. The bushing 600 can physically and electrically isolate the threaded rod 340 from the brackets 310, 320 when the threaded rod 340 extends through the through hole 400 of the brackets 310, 320 (respectively). The bushing 600 can physically and electrically isolate the washer 610 and the nut 350 from the bracket 310, such as by providing a physical barrier between the fasteners 330 and the brackets 310, 320. Optionally, the bushing 600 is located between individual ones of the fasteners 330 to physically and electrically isolate an individual one of the fasteners 330 from another one of the fasteners 330 (e.g., the bushing 600 can be located between the washer 610 and the nut 350), for example to physically and electrically isolate the fasteners 330 from each other.

The bushing 600 can include an insulating or dielectric material (e.g., a polymeric material, ceramic material, or the like), and accordingly the bushing 600 can electrically isolate components of the utility or communications system. The bushing 600 can have a stiff durometer to support the mechanical loads between components of the mounting assembly 300. For example, the bushing 600 can have a durometer measured in accordance with, for example, the American Society for Testing and Materials ("ASTM") Standard D2240 A and within a range of approximately 90 A to approximately 100 A. The fasteners 330 can include (but are not limited to) threaded rod 340, nut 350, a washer 610, a bolt, or a screw.

Figure 7:
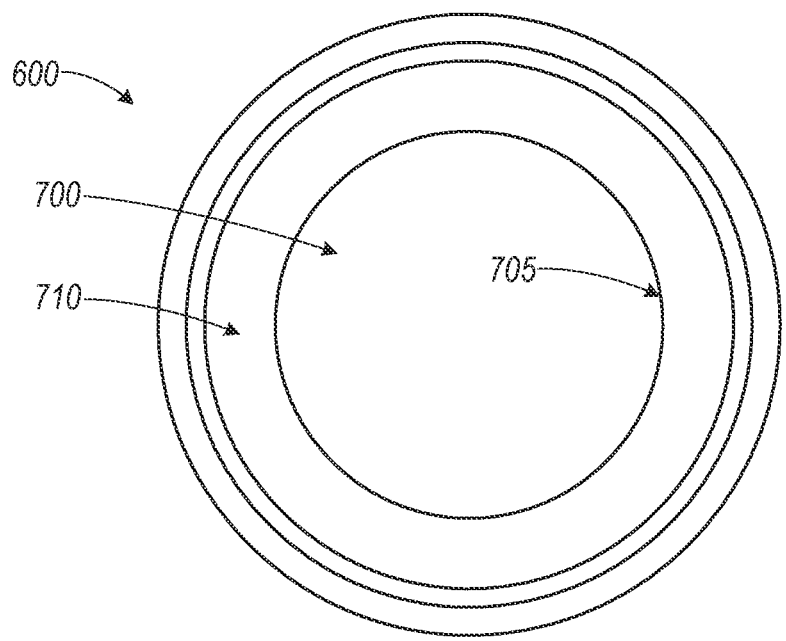
FIG. 7 illustrates a top view of a bushing.
Figure 8:
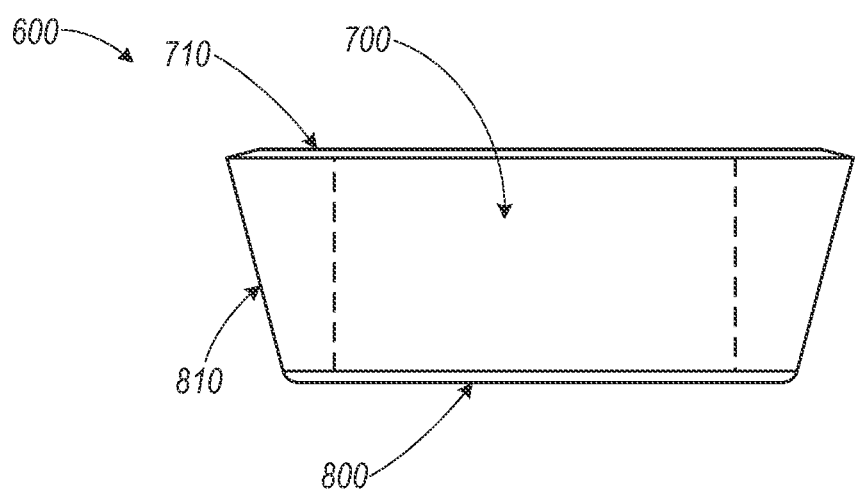
FIG. 8 illustrates a side view of the bushing of FIG. 7.

FIG. 7 and FIG. 8 illustrate a top view and a side view (respectively) of the bushing 600. The bushing 600 defines a fastener aperture 700 that extends through a thickness of the bushing 600. For example, the bushing includes aperture walls 705 that surround the fastener aperture 700. The fastener aperture 700 can extend between a first face 710 of the bushing 600 to a second face 800 of the bushing 600. The fastener aperture 700 is sized and shaped to receive one or more of the fasteners 330, for instance the threaded rod 340. The bushing 600 can physically and electrically isolate the fasteners 330 (e.g., the threaded rod 340) from the bracket 310 (or the bracket 320) when the fasteners 330 extend through the through hole 400 (shown in FIG. 6) via the bushing 600 (shown in FIG. 10).

The bushing 600 can include a tapered side wall 810, and the tapered side wall can extend between the faces 710, 800 of the bushing 600. In an example, the first face 710 has a first dimension (e.g., diameter, width, or the like) and the second face 800 has a second dimension that is less than the first dimension of the first face 710. The tapered side wall 810 extends between the faces 710, 800, for instance to provide a transition between varying dimensions of the bushing 600.

The bushing 600 includes a bushing profile 720. The bushing profile 720 can be frustoconical, for instance to facilitate insertion of the bushing 600 into the through hole 400 (shown in FIG. 10). The bushing profile 720 can correspond with the through hole profile 410 of the through hole 400 (shown in FIG. 4) to allow through hole 400 to receive at least a portion of the bushing 600. The fastener aperture 700 can receive one or more of the fasteners 330, and the aperture walls 705 can be located between the fasteners 330 and the bracket 310 (or the bracket 320). In an example, the bushing 600 physically isolates the fasteners 330 from the bracket 310 when the aperture walls 705 are located between one or more of the fasteners 330 and the bracket 310. Physically and electrically isolating the fasteners 330 from the brackets 310, 320 helps inhibit non-linearities in a utility or communications system, and helps inhibit passive-intermodulation of electromagnetic signals transmitted through mechanical components of the utility or communications system.

Figure 9:
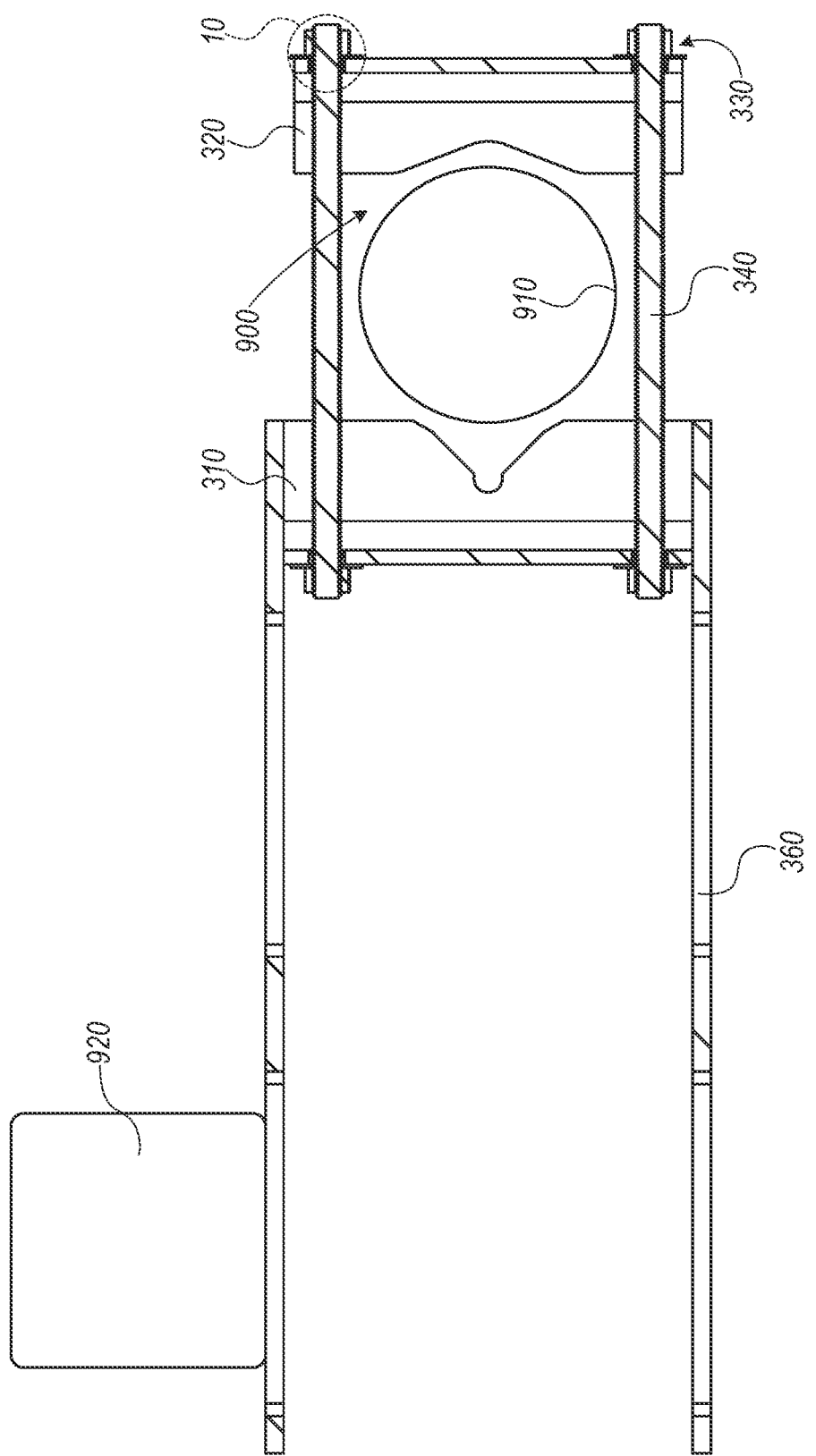
FIG. 9 illustrates a cross-sectional view of the passive-intermodulation-mitigating mounting assembly.

FIG. 9 illustrates a cross-sectional view of the passive-intermodulation-mitigating mounting assembly 300. The mounting assembly 300 can define a fixture recess 900 sized and shaped to receive a fixture 910. As described herein, the fixture 910 can include one or more components of the utility pole 110 or the platform assembly 200. In an example, the brackets 310, 320 can straddle the mounting pipe 212. The fasteners 330 (e.g., the threaded rod 340) can extend through the brackets 310, 320 and can be physically and electrically isolated from the fixture 910 (and the brackets 310, 320). For instance, the threaded rod 340 can be spaced apart from the fixture 910 when the brackets 310, 320 engage with the fixture 910 to attach the mounting assembly 300 to the fixture 910. In an example, the fasteners 330 can be operated (e.g., by a user manipulating the nut 350) to compress the brackets 310, 320 against the fixture 910 and attach the mounting assembly 300 to the fixture 910.

As described herein, the mounting assembly 300 supports one or more electronic components 920 (e.g., a radio, antenna, or the like) and facilitates mounting of the electronic components to a fixture of the utility pole 110 (shown in FIG. 1) or the platform assembly 200 (shown in FIG. 2). For example, the electronic components 920 can be coupled to the mounting plate 360. The mounting plate 360 can extend from one or more of the brackets 310, 320 and can support the electronic components 920 when the mounting assembly 300 is attached to a fixture of the utility pole 110 or the platform assembly 200.

FIG. 9 shows a circle 10. The circle 10 indicates the position of the partial view shown in FIG. 10.

Figure 10:
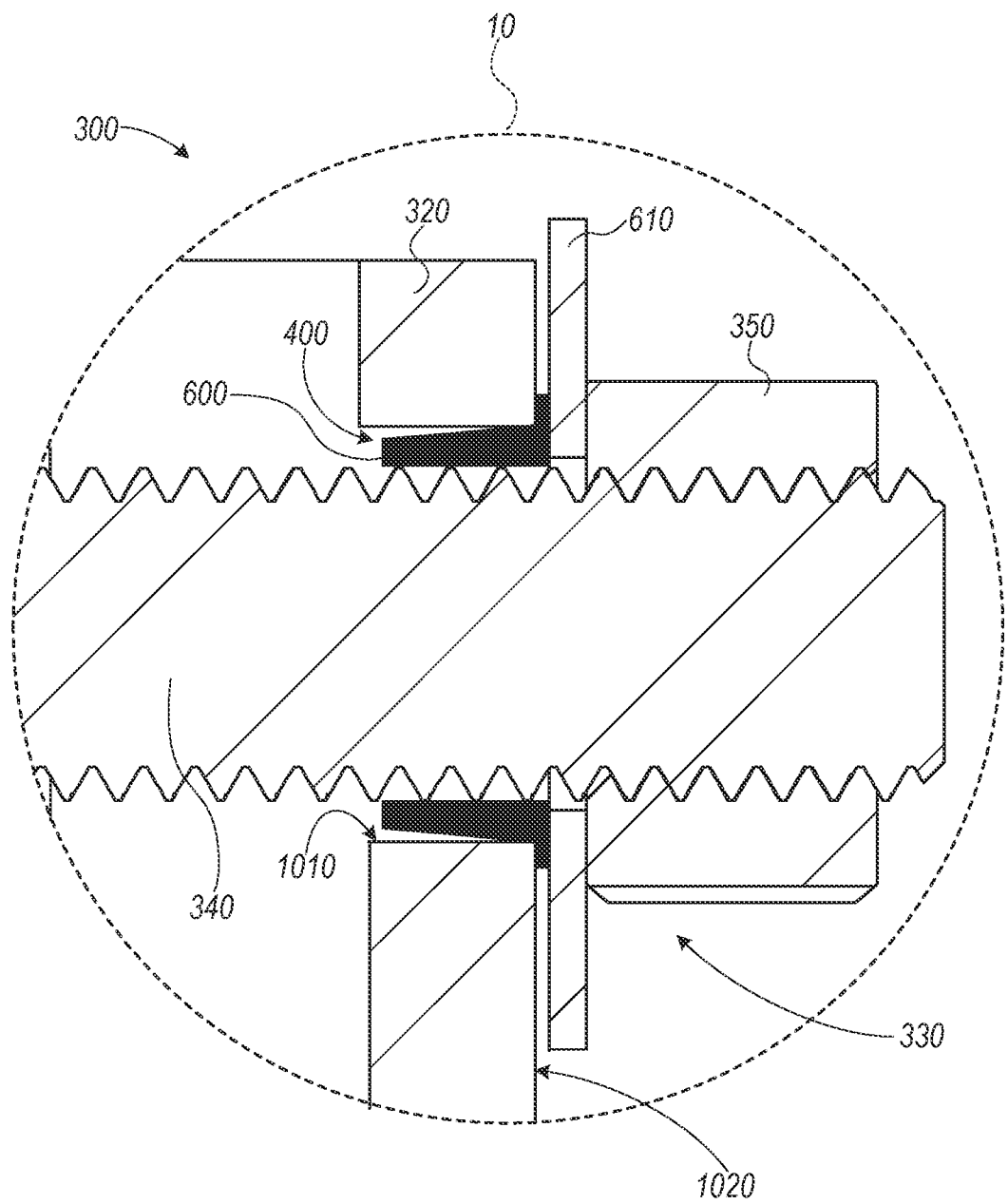
FIG. 10 illustrates a partial cross-sectional view of the passive-intermodulation-mitigating mounting assembly.

FIG. 10 illustrates a partial cross-sectional view of the passive-intermodulation-mitigating mounting assembly 300 at the position indicated by the circle 10 in FIG. 9. As described herein, the bushing 600 helps inhibit passive-intermodulation of components of a utility or communications system (e.g., the mounting assembly 300, platform assembly 200, monopole 100, electronic components 920, or the like). For example, the bushing 600 can physically and electrically isolate the fasteners 330 (e.g., one or more of the threaded rod 340, the washer 610, or the nut 350) from the bracket 310 (or bracket 320) when the fasteners 330 extend through the through hole 400 via the bushing 600. The bushing 600 can project from a bracket face 1020 of the bracket 320 (or the bracket 310, shown in FIG. 3). For instance, the bushing 600 can be located between the face 1020 of the bracket 320 and the washer 610 (or the nut 350) to help physically and electrically isolate the fasteners 330 from the bracket 320 (or the bracket 310). Optionally, the bushing 600 includes a tab, flange, appendage or the like that is located between the face 1020 and the fasteners 330 (e.g., the washer 610).

As described herein, the bushing 600 can be inserted into the through hole 400 to physically and electrically isolate one or more of the fasteners 330 from the brackets 310, 320. The bushing 600 can be located between the fasteners 330 and the brackets 310, 320 to help physically and electrically isolate the fasteners 330 from the brackets 310, 320. In some examples, the bushing 600 has an interference fit with the through hole 400 (and/or the fasteners 330), such as by engaging the tapered side wall 810 (e.g., as shown in FIG. 8) with a bracket wall 1010 that surrounds the through hole 400.

In some examples, the bushing 600 can physically and electrically isolate when the bushing 600 is inserted into the through hole 400 and one or more of the fasteners 330 extend through the through holes 400 via the bushing 600. For instance, the bushing 600 physically and electrically isolates when the fasteners 330 are received in the fastener aperture 700 and the bushing 600 is inserted into the through hole 400. The physical and electrical isolation provided by the bushing 600 inhibits passive-intermodulation of components of a utility or telecommunications system. For example, the bushing 600 can inhibit or reduce electrical conduction between adjacent electrically conductive mechanical components (e.g., metal components, or the like) of the utility or telecommunications system (e.g., the threaded rod 340 and the bracket 320). The bushing 600 reduces mating of mechanical components and thereby inhibits the presence non-linearities within the utility or telecommunications system. Accordingly, the performance of the utility or telecommunications system is improved by the passive-intermodulation-mitigating mounting assembly 300.

Figure 11:
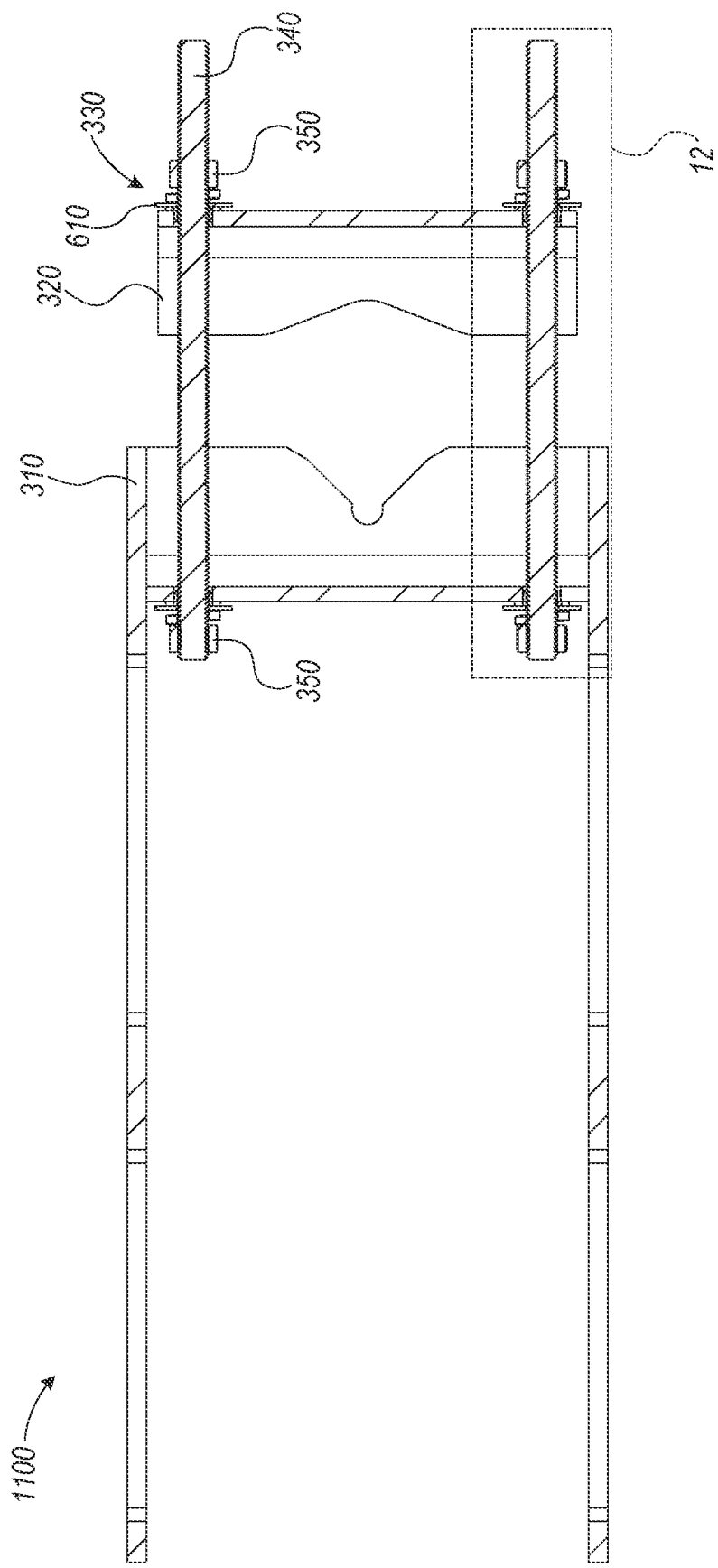
FIG. 11 illustrates a cross-sectional view of yet another example of a passive-intermodulation-mitigating mounting assembly.

FIG. 11 illustrates a cross-sectional view of yet another example of a passive-intermodulation-mitigating mounting assembly 1100. The mounting assembly 1100 includes features, parts, components, or the like similar to the mounting assembly 300 disclosed herein. For example, the passive-intermodulation-mitigating mounting assembly 1100 can include one or more of the first bracket 310 and the second bracket 320. In another example, the mounting assembly 1100 can include the one or more fasteners 330, such as the threaded rod 340 and the nut 350. In yet another example, the mounting assembly 1100 can include the washer 610. The fasteners 330 can help couple the first bracket 310 and the second bracket together 320, for instance to attach the mounting assembly to a fixture.

Figure 12:
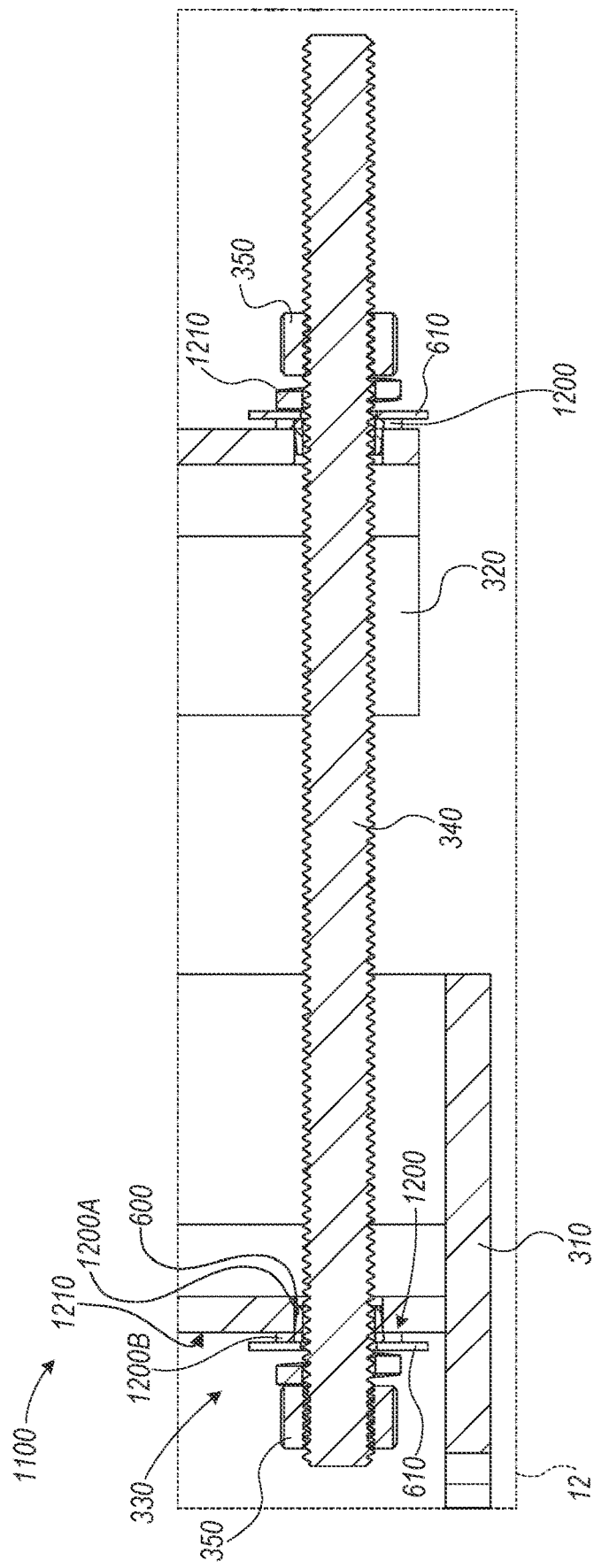
FIG. 12 illustrates a detailed cross-sectional view of the passive-intermodulation-mitigating mounting assembly of FIG. 11 at the rectangle 12.

FIG. 12 illustrates a detailed cross-sectional view of the passive-intermodulation-mitigating mounting assembly 1100 of FIG. 11 at the rectangle 12. The mounting assembly 1100 can include the fasteners 330. For instance, the mounting assembly 1100 can include one or more dielectric rings 1200 (e.g., an annulus, band, loop, ring, hoop, or the like), such as a dielectric first ring 1200A and a dielectric second ring 1200B. The dielectric rings 1200 can be aligned with a through hole (e.g., the through hole 400, shown in FIG. 4) of the brackets 310, 320. The rings 1200 help inhibit passive-intermodulation between components of the mounting assembly 1100, such as passive-intermodulation between the brackets 310, 320 and the fasteners 330. For instance, the rings 1200 help physically and electrically isolate the fasteners 330 from the brackets 310, 320, such as by interrupting electrical conductivity between the components of the mounting assembly 1100. In some examples, the rings 1200 are a unitary piece. For instance, the dielectric second ring 1200B may extend outward radially from the dielectric first ring 1200A. In another example, the dielectric first ring 1200A is a separate piece from the dielectric second ring 1200B. In an example, the rings 1200 can have a durometer measured in accordance with, for example, the American Society for Testing and Materials ("ASTM") Standard D2240 A and within a range of approximately 90 A to approximately 100 A. In another example, the rings 1200 can have a durometer measured in accordance with, for example, the American Society for Testing and Materials ("ASTM") Standard D2240 D and within a range of approximately 60 D to approximately 90 D. For example, one or more of the rings 1200 can have a durometer of 80 D (however the present subject matter is not so limited).

In another example, the dielectric first ring 1200A includes the bushing 600. For example, the dielectric first ring 1200A can be inserted into a through hole (e.g., the through hole 400, shown in FIG. 4) of the brackets 310, 320. In yet another example, the dielectric second ring 1200B can project from a face (e.g., a bracket face 1020) of the brackets 310, 320. For instance, the dielectric second ring 1200B can be located between a bracket face 1210 and the washer 610. In a further example, the rings 1200 are located between a lock washer 1220 and the bracket face 1210. Still further, the rings can be located between the bracket face 1210 and the nut 350. Accordingly, the dielectric rings 1200 help inhibit passive-intermodulation between the brackets 310, 320 and the fasteners 330.

Figure 13:
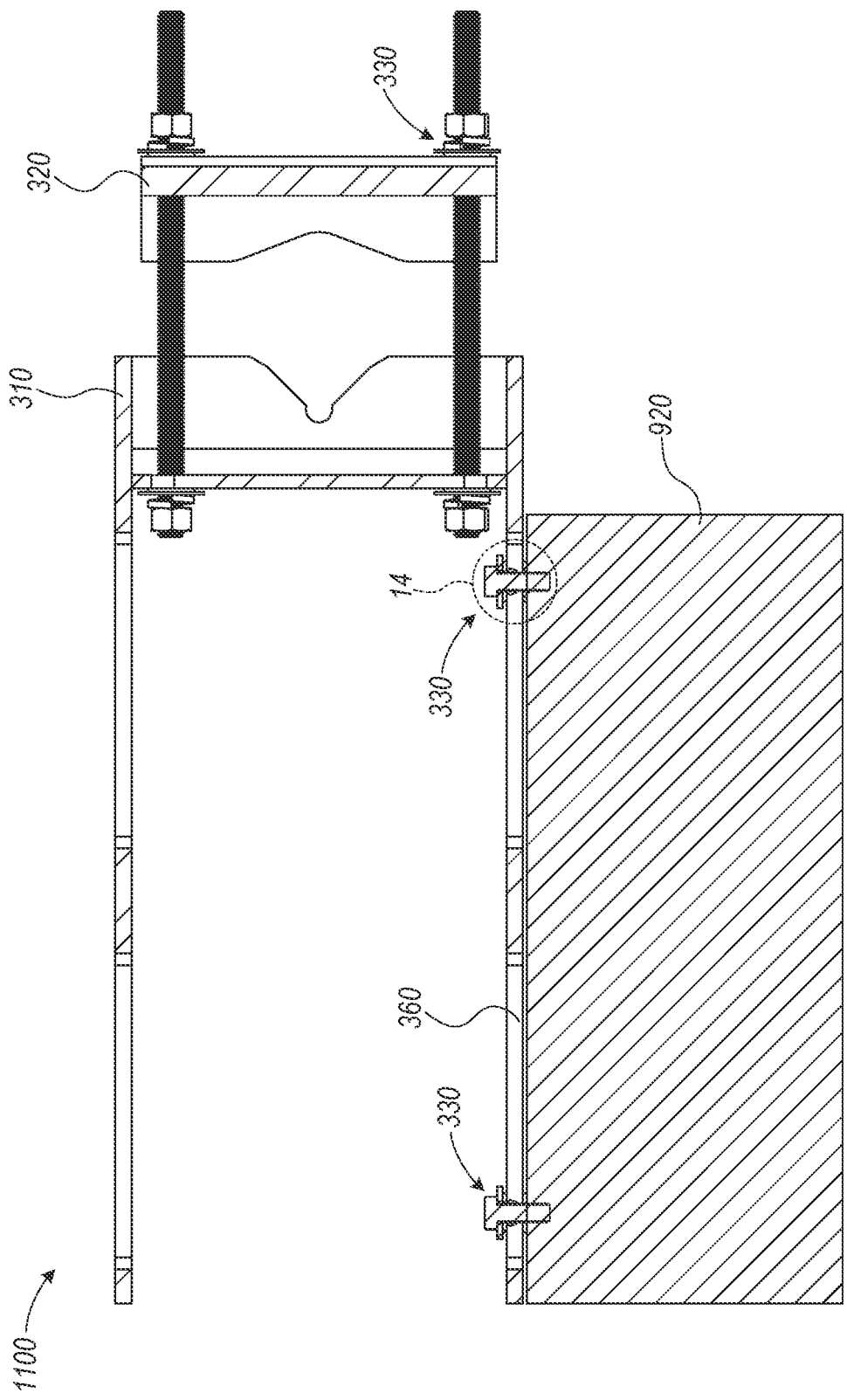
FIG. 13 illustrates a cross-sectional view of still yet another example of a passive-intermodulation-mitigating mounting assembly.

FIG. 13 illustrates a cross-sectional view of still yet another example of a passive-intermodulation-mitigating mounting assembly 1300. The mounting assembly 1300 includes features, parts, components, or the like similar to the mounting assembly 300 (or mounting assembly 1100) disclosed herein. For example, the passive-intermodulation-mitigating mounting assembly 1300 can include one or more of the first bracket 310 and the second bracket 320. In another example, the mounting assembly 1100 can include the one or more fasteners 330, such as the threaded rod 340 and the nut 350. The first bracket 310 can include the mounting plate 360. The electronic components 920, such as an antenna or radio, can be attached to the mounting plate 360. Accordingly, the mounting assembly 1300 supports the electronic components 920.

Figure 14:
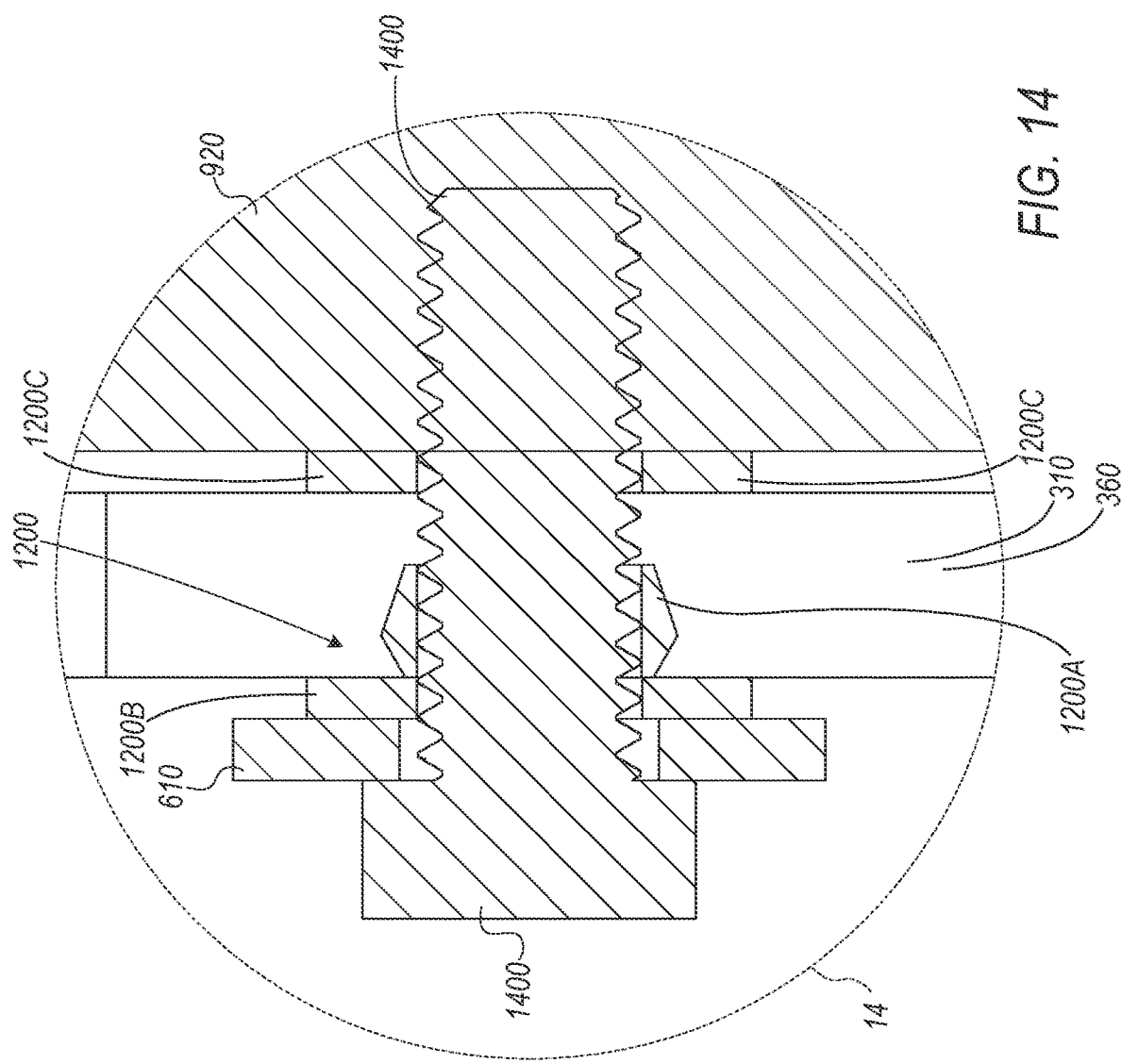
FIG. 14 illustrates a detailed cross-sectional view of the passive-intermodulation-mitigating mounting assembly of FIG. 14 at the circle 14.

FIG. 14 illustrates a detailed cross-sectional view of the passive-intermodulation-mitigating mounting assembly 1300 of FIG. 14 at the circle 14. The mounting assembly 1300 can include the dielectric rings 1200. For example, the dielectric first ring 1200A can be located between a mounting plate fastener 1400 and the mounting bracket 310. The dielectric first ring 1200A can extend at least partially through the mounting bracket 310. In another example, the dielectric first ring 1200A can interrupt electrical conductivity between the mounting plate 360 and the mounting plate fastener 1400.

In yet another example, the dielectric second ring 1200B can be located between the mounting bracket 310 (e.g., a face of the mounting plate 360) and the washer 610. Thus, the dielectric second ring 1200B can interrupt electrical conductivity between the mounting plate 360 and the washer 610). In still yet another example, the dielectric second ring 1200B is located between the mounting plate fastener 1400 and the mounting plate 360 (e.g., between a head of a bolt and the mounting plate 360, or the like). Accordingly, the dielectric second ring 1200B can interrupt electrical conductivity between the mounting plate 360 and the mounting plate fastener 1400.

The mounting assembly 1300 can include a dielectric third ring 1200C. The third ring 1200C can be a unitary piece with one or more of the dielectric rings 1200A, 1200B. The dielectric rings 1200A, 1200B, 1200C can be separate pieces from each other. The dielectric third ring 1200C can be located between the electronic components 920 and the mounting plate 360 (e.g., a face of the mounting plate 360, or the like). Accordingly, the dielectric ring 1200C can interrupt electrical conductivity between the mounting plater 360 and the mounting plate fastener 1400. Thus, one or more of the dielectric rings 1200 help inhibit passive-intermodulation between the mounting plate 260 and the fasteners 330 (including the mounting plate fastener 1400).

FIG. 15 illustrates a detailed cross-sectional view of another example of the passive-intermodulation-mitigating mounting assembly 1300 of FIG. 14 at the circle 14. As described herein, the dielectric first ring 1200A can extend at least partially through the mounting plate 360. For example, the dielectric first ring 1200A can extend through a thickness of the mounting plate 360. In another example, the dielectric first ring 1200A extends between the dielectric second ring 1200B and the dielectric third ring 1200C. For instance, the dielectric rings 1200A, 1200B, 1200C can be a unitary piece. In an example, the dielectric second ring 1200B can project from a first surface 1500 of the mounting plate 360. The dielectric third ring 1200C can project from a second surface 1510 of the mounting plate 360. The dielectric first ring 1200A can extend between the dielectric second ring 1200B and the dielectric third ring 1200C. In some examples, the dielectric rings 1200A, 1200B, 1200C can be separate pieces. Accordingly, the dielectric rings 1200 helps inhibit passive-intermodulation between components of the mounting assembly 1300.

Various Notes & Aspects

Example 1 is a passive-intermodulation-mitigating mounting assembly for a utility or communications fixture, the mounting assembly comprising: a first bracket defining a first through hole and including a mounting plate extending from the first bracket, wherein the mounting plate is configured to support an antenna or a radio and the first bracket is electrically-conductive; a second bracket defining a second through hole, wherein the second bracket is electrically-conductive; a fastener configured to extend through the first through hole and the second through hole to couple the first bracket with the second bracket to attach the mounting assembly to the fixture, wherein the fastener is electrically-conductive; and a dielectric first ring configured for alignment with the first through hole or the second through hole to help physically and electrically isolate the electrically-conductive fastener from the electrically-conductive first bracket or the electrically-conductive second bracket such that dielectric isolation provided by the dielectric first ring helps inhibit the passive intermodulation of the mounting assembly by interrupting electrical conductivity from the fastener to the electrically-conductive first bracket or the electrically-conductive second bracket through which the fastener extends, in a physically and electrically isolated manner via the dielectric first ring, through at least one of the first through hole or the second through hole.

In Example 2, the subject matter of Example 1 optionally includes wherein the dielectric first ring is sized and shaped for insertion into the first through hole or the second through hole.

In Example 3, the subject matter of Example 2 optionally includes wherein the dielectric first ring is configured to project from a face of the first bracket or the second bracket.

In Example 4, the subject matter of Example 3 optionally includes wherein the dielectric first ring includes: a first portion sized and shaped for insertion into the first through hole or the second through hole; a second portion extending outward radially from the first portion, wherein the second portion is configured to project from the face of the first bracket or the second bracket.

In Example 5, the subject matter of any one or more of Examples 1-4 optionally include wherein the dielectric first ring projects from a face of the first bracket or the second bracket.

In Example 6, the subject matter of any one or more of Examples 1-5 optionally include wherein the fastener is a bolt and further comprising a washer, wherein the dielectric first ring interrupts electrical conductivity from the bolt and the washer to the electrically-conductive first bracket or the electrically-conductive second bracket.

In Example 7, the subject matter of any one or more of Examples 1-6 optionally include wherein the dielectric material includes a polymeric material.

In Example 8, the subject matter of any one or more of Examples 1-7 optionally include wherein the dielectric material has a durometer within a range of approximately 90 A to approximately 100 A.

Example 9 is a passive-intermodulation-mitigating mounting assembly for a utility or communications fixture, the mounting assembly comprising: a first bracket defining a first through hole and including a mounting plate extending from the first bracket, wherein the mounting plate is configured to support an antenna or a radio and the first bracket is electrically-conductive; a first fastener configured to extend through the first through hole to couple the antenna or the radio with the mounting plate, wherein the first fastener is electrically-conductive; and a dielectric first ring configured for alignment with the first through hole to help physically and electrically isolate the electrically-conductive fastener from the electrically-conductive first bracket such that dielectric isolation provided by the dielectric first ring helps inhibit the passive intermodulation of the mounting assembly by interrupting electrical conductivity from the fastener to the electrically-conductive first bracket through which the fastener extends, in a physically and electrically isolated manner via the dielectric first ring, through at least one of the first through hole. In Example 10, the subject matter of Example 9 optionally includes a dielectric second ring, wherein: the dielectric first ring is configured for placement on a first side of the mounting bracket; and the dielectric second ring is configured for placement on a second side of the mounting bracket between the mounting bracket and the antenna or the radio. In Example 11, the subject matter of Example 10 optionally includes a dielectric third ring configured for insertion into the first through hole.

In Example 12, the subject matter of any one or more of Examples 9-11 optionally include wherein: the first bracket includes a second through hole; and the passive-intermodulation-mitigating mounting assembly includes a dielectric second ring configured for alignment with the second through hole to help physically and electrically isolate an electrically-conductive second fastener from the electrically-conductive first bracket such that dielectric isolation provided by the dielectric second ring helps inhibit the passive intermodulation of the mounting assembly by interrupting electrical conductivity from the second fastener to the electrically-conductive first bracket through which the fastener extends, in a physically and electrically isolated manner via the dielectric second ring through the second through hole.

In Example 13, the subject matter of Example 12 optionally includes the second fastener configured to extend through the second through hole to couple the first bracket with the fixture.

In Example 14, the subject matter of any one or more of Examples 9-13 optionally include wherein: the first bracket defines a second through hole; the passive-intermodulation-mitigating mounting assembly includes a second bracket defining a third through hole, wherein the second bracket is electrically-conductive; and a second fastener configured to extend through the first through hole and the second through hole to couple the first bracket with the second bracket to attach the mounting assembly to the fixture, wherein the second fastener is electrically-conductive.

In Example 15, the subject matter of any one or more of Examples 9-14 optionally include a second fastener, wherein the washer is electrically-conductive and the dielectric first ring is located between the washer and the first bracket to electrically isolate the first bracket from the washer to help inhibit passive-intermodulation between the first bracket and the washer.

Example 16 is a passive-intermodulation-mitigating mounting assembly for a utility or communications fixture, the mounting assembly comprising: a first bracket defining a first through hole and including a mounting plate extending from the first bracket, wherein the mounting plate is configured to support an antenna or a radio and the first bracket is electrically-conductive; a second bracket defining a second through hole, wherein the second bracket is electrically-conductive; a first fastener configured to extend through the first through hole and the second through hole to couple the first bracket with the second bracket to attach the mounting assembly to the fixture, wherein the first fastener is electrically-conductive; a dielectric first ring configured for insertion into the first through hole to help physically and electrically isolate the electrically-conductive first fastener from the electrically-conductive first bracket such that dielectric isolation provided by the dielectric first ring helps inhibit the passive intermodulation of the mounting assembly by interrupting electrical conductivity from the first fastener to the electrically-conductive first bracket; and a dielectric second ring configured for insertion into the second through hole to help physically and electrically isolate the electrically-conductive first fastener from the electrically-conductive second bracket such that dielectric isolation provided by the dielectric second ring helps inhibit the passive intermodulation of the mounting assembly by interrupting electrical conductivity from the first fastener to the electrically-conductive second bracket.

In Example 17, the subject matter of Example 16 optionally includes wherein: the first bracket defines a third through hole; the second bracket defines a fourth through hole; the passive-intermodulation-mitigating mounting assembly includes a second fastener configured to extend through the third through hole and the fourth through hole to couple the first bracket with the second bracket to attach the mounting assembly to the fixture, wherein the second fastener is electrically-conductive; the passive-intermodulation-mitigating mounting assembly includes a dielectric third ring configured for insertion into the third through hole to help physically and electrically isolate the electrically-conductive second fastener from the electrically-conductive first bracket such that dielectric isolation provided by the dielectric third ring helps inhibit the passive intermodulation of the mounting assembly by interrupting electrical conductivity from the second fastener to the electrically-conductive first bracket; and the passive-intermodulation-mitigating mounting assembly includes a dielectric fourth ring configured for insertion into the fourth through hole to help physically and electrically isolate the electrically-conductive second fastener from the electrically-conductive second bracket such that dielectric isolation provided by the dielectric fourth ring helps inhibit the passive intermodulation of the mounting assembly by interrupting electrical conductivity from the first fastener to the electrically-conductive second bracket.

In Example 18, the subject matter of Example 17 optionally includes a third fastener configured to extend through a fifth through hole defined by the mounting plate to couple the antenna or the radio with the mounting plate, wherein the third fastener is electrically-conductive; and a fifth dielectric ring configured for alignment with the fifth through hole to help physically and electrically isolate the electrically-conductive fastener from the electrically-conductive first bracket such that dielectric isolation provided by the fifth dielectric ring helps inhibit the passive intermodulation of the mounting assembly by interrupting electrical conductivity from the third fastener to the electrically-conductive first bracket.

In Example 19, the subject matter of Example 18 optionally includes at least one of the antenna or the radio.

In Example 20, the subject matter of any one or more of Examples 17-19 optionally include wherein: passive-intermodulation-mitigating mounting assembly includes a fixture recess sized and shaped to receive the fixture; the first fastener is located on a first side of the fixture recess with the first fastener extending through the first through hole and the second through hole; and the second fastener is located on a second side of the fixture recess with the second fastener extending through the third through hole and the fourth through hole.

In Example 21, the subject matter of any one or more of Examples 16-20 optionally include wherein the mounting plate extending from the first bracket is a first mounting plate, the passive-intermodulation-mitigating mounting assembly further including: a second mounting plate configured to support an antenna or a radio.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A passive-intermodulation-mitigating mounting assembly for a utility or communications fixture, the mounting assembly comprising:
    a first bracket having a first bracket wall defining a first through hole and a first bracket face proximate the first bracket wall, the first bracket including a mounting plate extending from the first bracket, wherein the mounting plate is configured to support an antenna or a radio and the first bracket is electrically-conductive;
    a second bracket having a second bracket wall defining a second through hole and a second bracket face proximate the second bracket wall, wherein the second bracket is electrically-conductive;
    a fastener configured to extend through the first through hole and the second through hole to couple the first bracket with the second bracket to attach the mounting assembly to the fixture, wherein the fastener is electrically-conductive; and
    a dielectric first ring configured for alignment with the first through hole or the second through hole to help physically and electrically isolate the electrically-conductive fastener from the first bracket wall and the first bracket face of the electrically-conductive first bracket or the second bracket wall and the second bracket face of the electrically-conductive second bracket such that dielectric isolation provided by the dielectric first ring helps inhibit the passive intermodulation of the mounting assembly by interrupting electrical conductivity from the fastener to the electrically-conductive first bracket or the electrically-conductive second bracket through which the fastener extends, in a physically and electrically isolated manner via the dielectric first ring, through at least one of the first through hole or the second through hole.

2. The passive-intermodulation-mitigating mounting assembly of claim 1, wherein the dielectric first ring is sized and shaped for insertion into the first through hole or the second through hole.

3. The passive-intermodulation-mitigating mounting assembly of claim 2, wherein the dielectric first ring is configured to project from a face of the first bracket or the second bracket.

4. The passive-intermodulation-mitigating mounting assembly of claim 3, wherein the dielectric first ring includes:
    a first portion sized and shaped for insertion into the first through hole or the second through hole;
    a second portion extending outward radially from the first portion, wherein the second portion is configured to project from the face of the first bracket or the second bracket.

5. The passive-intermodulation-mitigating mounting assembly of claim 1, wherein the dielectric first ring projects from a face of the first bracket or the second bracket.

6. The passive-intermodulation-mitigating mounting assembly of claim 1, wherein the fastener is a bolt and further comprising a washer, wherein the dielectric first ring interrupts electrical conductivity from the bolt and the washer to the electrically-conductive first bracket or the electrically-conductive second bracket.

7. The passive-intermodulation-mitigating mounting assembly of claim 1, wherein the dielectric material includes a polymeric material.

8. The passive-intermodulation-mitigating mounting assembly of claim 1, wherein the dielectric material has a durometer within a range of approximately 60 D to approximately 90 D.

9. A passive-intermodulation-mitigating mounting assembly for a utility or communications fixture, the mounting assembly comprising:
   a first bracket having a first bracket wall defining a first through hole and a first bracket face proximate the first bracket wall, the first bracket including a mounting plate extending from the first bracket, wherein the mounting plate is configured to support an antenna or a radio and the first bracket is electrically-conductive;
   a first fastener configured to extend through the first through hole to couple the antenna or the radio with the mounting plate, wherein the first fastener is electrically-conductive; and
   a dielectric first ring configured for alignment with the first through hole to help physically and electrically isolate the electrically-conductive fastener from the first bracket wall and the first bracket face of the electrically-conductive first bracket such that dielectric isolation provided by the dielectric first ring helps inhibit the passive intermodulation of the mounting assembly by interrupting electrical conductivity from the fastener to the electrically-conductive first bracket through which the fastener extends, in a physically and electrically isolated manner via the dielectric first ring, through at least one of the first through hole.

10. The passive-intermodulation-mitigating mounting assembly of claim 9; further comprising a dielectric second ring, wherein:
   the dielectric first ring is configured for placement on a first side of the mounting bracket; and
   the dielectric second ring is configured for placement on a second side of the mounting bracket between the mounting bracket and the antenna or the radio.

11. The passive-intermodulation-mitigating mounting assembly of claim 10, further comprising:
   a dielectric third ring configured for insertion into the first through hole.

12. The passive-intermodulation-mitigating mounting assembly of claim 9, wherein:
   the first bracket includes a second through hole; and
   the passive-intermodulation-mitigating mounting assembly includes a dielectric second ring configured for alignment with the second through hole to help physically and electrically isolate an electrically-conductive second fastener from the electrically-conductive first bracket such that dielectric isolation provided by the dielectric second ring helps inhibit the passive intermodulation of the mounting assembly by interrupting electrical conductivity from the second fastener to the electrically-conductive first bracket through which the fastener extends, in a physically and electrically isolated manner via the dielectric second ring through the second through hole.

13. The passive-intermodulation-mitigating mounting assembly of claim 12, further comprising:
   the second fastener configured to extend through the second through hole to couple the first bracket with the fixture.

14. The passive-intermodulation-mitigating mounting assembly of claim 9, wherein:
   the first bracket defines a second through hole;
   the passive-intermodulation-mitigating mounting assembly includes a second bracket defining a third through hole, wherein the second bracket is electrically-conductive; and
   a second fastener configured to extend through the first through hole and the second through hole to couple the first bracket with the second bracket to attach the mounting assembly to the fixture, wherein the second fastener is electrically-conductive.

15. The passive-intermodulation-mitigating mounting assembly of claim 9, further comprising a second fastener, wherein a washer is electrically-conductive and the dielectric first ring is located between the washer and the first bracket to electrically isolate the first bracket from the washer to help inhibit passive-intermodulation between the first bracket and the washer.

16. A passive-intermodulation-mitigating mounting assembly for a utility or communications fixture, the mounting assembly comprising:
   a first bracket having a first bracket wall defining a first through hole and a first bracket face proximate the first bracket wall, the first bracket including a mounting plate extending from the first bracket, wherein the mounting plate is configured to support an antenna or a radio and the first bracket is electrically-conductive;
   a second bracket having a second bracket wall defining a second through hole and a second bracket face proximate the second bracket wall, wherein the second bracket is electrically-conductive;
   a first fastener configured to extend through the first through hole and the second through hole to couple the first bracket with the second bracket to attach the mounting assembly to the fixture, wherein the first fastener is electrically-conductive;
   a dielectric first ring configured for insertion into the first through hole to help physically and electrically isolate the first bracket wall and the first bracket face of electrically-conductive first fastener from the electrically-conductive first bracket such that dielectric isolation provided by the dielectric first ring helps inhibit the passive intermodulation of the mounting assembly by interrupting electrical conductivity from the first fastener to the electrically-conductive first bracket; and
   a dielectric second ring configured for insertion into the second through hole to help physically and electrically isolate the second bracket wall and the second bracket face of the electrically-conductive first fastener from the electrically-conductive second bracket such that dielectric isolation provided by the dielectric second ring helps inhibit the passive intermodulation of the mounting assembly by interrupting electrical conductivity from the first fastener to the electrically-conductive second bracket.

17. The passive-intermodulation-mitigating mounting assembly of claim 16, wherein:
   the first bracket defines a third through hole;
   the second bracket defines a fourth through hole;
   the passive-intermodulation-mitigating mounting assembly includes a second fastener configured to extend through the third through hole and the fourth through hole to couple the first bracket with the second bracket to attach the mounting assembly to the fixture, wherein the second fastener is electrically-conductive;
   the passive-intermodulation-mitigating mounting assembly includes a dielectric third ring configured for insertion into the third through hole to help physically and electrically isolate the electrically-conductive second fastener from the electrically-conductive first bracket such that dielectric isolation provided by the dielectric third ring helps inhibit the passive intermodulation of the mounting assembly by interrupting electrical conductivity from the second fastener to the electrically-conductive first bracket; and the passive-intermodulation-mitigating mounting assembly includes a dielectric fourth ring configured for insertion into the fourth through hole to help physically and electrically isolate the electrically-conductive second fastener from the electrically-conductive second bracket such that dielectric isolation provided by the dielectric fourth ring helps inhibit the passive intermodulation of the mounting assembly by interrupting electrical conductivity from the first fastener to the electrically-conductive second bracket.

18. The passive-intermodulation-mitigating mounting assembly of claim 17, further comprising:
a third fastener configured to extend through a fifth through hole defined by the mounting plate to couple the antenna or the radio with the mounting plate, wherein the third fastener is electrically-conductive; and
a fifth dielectric ring configured for alignment with the fifth through hole to help physically and electrically isolate the electrically-conductive fastener from the electrically-conductive first bracket such that dielectric isolation provided by the fifth dielectric ring helps inhibit the passive intermodulation of the mounting assembly by interrupting electrical conductivity from the third fastener to the electrically-conductive first bracket.

19. The passive-intermodulation-mitigating mounting assembly of claim 18, further comprising at least one of the antenna or the radio.

20. The passive-intermodulation-mitigating mounting assembly of claim 17, wherein:
passive-intermodulation-mitigating mounting assembly includes a fixture recess sized and shaped to receive the fixture;
the first fastener is located on a first side of the fixture recess with the first fastener extending through the first through hole and the second through hole; and
the second fastener is located on a second side of the fixture recess with the second fastener extending through the third through hole and the fourth through hole.

21. The passive-intermodulation-mitigating mounting assembly of claim 16, wherein the mounting plate extending from the first bracket is a first mounting plate, the passive-intermodulation-mitigating mounting assembly further including:
a second mounting plate configured to support an antenna or a radio.

* * * * *